United States Patent [19]

Leu

[11] Patent Number: 5,364,119
[45] Date of Patent: Nov. 15, 1994

[54] COLLAPSIBLE FRAME ASSEMBLY AND STROLLER

[75] Inventor: Sammy W. Leu, Tujunga, Calif.

[73] Assignee: Reebok International Ltd., Stoughton, Mass.

[21] Appl. No.: 134,792

[22] Filed: Oct. 12, 1993

[51] Int. Cl.⁵ .............................................. B62B 7/08
[52] U.S. Cl. ...................................... 280/647; 280/650
[58] Field of Search ............... 280/642, 643, 647, 648, 280/658, 47.38, 650

[56] References Cited

U.S. PATENT DOCUMENTS

| | | | |
|---|---|---|---|
| D. 160,598 | 10/1950 | Heideman | D14/14 |
| D. 239,523 | 4/1976 | Firth et al. | D12/129 |
| D. 297,525 | 9/1988 | Baechler | D12/129 |
| D. 315,885 | 4/1991 | Jacobs | D12/129 |
| D. 322,420 | 12/1991 | Hawkes | D12/129 |
| 3,643,980 | 2/1972 | Kirsch | 280/643 |
| 3,653,681 | 4/1972 | Virtue | 280/36 B |
| 4,032,173 | 6/1977 | Clegg | 280/650 |
| 4,042,249 | 8/1977 | Kassai | 280/38 |
| 4,072,318 | 2/1978 | Laune | 280/42 |
| 4,491,335 | 1/1985 | Evron | 280/47.41 |
| 4,544,178 | 10/1985 | Al-Sheikh | 280/642 |
| 4,545,599 | 10/1985 | Kassai | 280/642 |
| 4,606,550 | 8/1986 | Cone | 280/642 |
| 4,632,421 | 12/1986 | Shamie | 280/642 |
| 4,681,340 | 7/1987 | Pasquini | 280/642 |
| 4,741,551 | 5/1988 | Perego | 280/642 |
| 4,828,278 | 5/1989 | Nakao et al. | 280/658 X |
| 4,836,573 | 6/1989 | Gebhard | 280/644 |
| 4,844,504 | 7/1989 | Bigo | 280/647 X |
| 4,848,787 | 7/1989 | Kassai | 280/642 |
| 4,887,834 | 12/1989 | Cabagnero | 280/642 |
| 4,902,027 | 2/1990 | Skelly | 280/33.998 |
| 4,907,818 | 3/1990 | Chai | 280/642 |
| 4,915,401 | 4/1990 | Severson et al. | 280/30 |
| 4,934,728 | 6/1990 | Chen | 280/644 |
| 4,953,880 | 9/1990 | Sudakoff et al. | 280/47.38 |
| 5,029,891 | 7/1991 | Jacobs | 280/650 |
| 5,074,575 | 12/1991 | Bigo | 280/642 |
| 5,076,599 | 12/1991 | Lockett et al. | 280/204 |
| 5,123,670 | 6/1992 | Chen | 280/650 |
| 5,176,395 | 1/1993 | Garforth-Bles | 280/415.1 |
| 5,188,389 | 2/1993 | Baechler | 280/650 |
| 5,201,535 | 4/1993 | Kato et al. | 280/30 |
| 5,203,577 | 4/1993 | Kato et al. | 280/30 |
| 5,224,720 | 7/1993 | Chaw et al. | 280/62 |
| 5,265,891 | 11/1993 | Diehl | 280/1.5 |
| 5,299,825 | 4/1994 | Smith | 280/644 |
| 5,301,963 | 4/1994 | Chen | 280/30 |

OTHER PUBLICATIONS

Gerry Rollerbaby Advertisement (1 page).
Runabout/USA Inc. Brochure, 6 pages (1991).
Huffy Easy Strider Brochure, 2 pages (1992).

Primary Examiner—Karin L. Tyson
Assistant Examiner—Carla Mattix
Attorney, Agent, or Firm—Sterne, Kessler, Goldstein & Fox

[57] ABSTRACT

A collapsible frame assembly which may be used as a stroller frame. The frame includes a base, an upper support, a lower support attached to the base, an upper brace attached to the lower support, and a lower brace attached to the base. Hinges connect the upper and lower support, and the upper and lower brace, to permit the transformation between collapsed and upright positions. The frame collapses in height and length, and is transformed between a collapsed position and an upright position by pulling the upper support upwardly and rearwardly from the lower support.

20 Claims, 10 Drawing Sheets

COLLAPSIBLE FRAME ASSEMBLY AND STROLLER

FIELD OF THE INVENTION

The present invention relates to collapsible frame assemblies, and more particularly to a collapsible frame assembly for a stroller.

BACKGROUND OF THE INVENTION

Many types of baby carriages and strollers have been developed to meet specific needs. For example, a perambulator style carriage was designed for "strolling" with a baby. Such a carriage is often suitable for only carrying an infant because no support is provided for carrying a child in a sitting position. Stroller style carriages have also been developed which can be configured either as an infant carriage for transporting a baby in a reclining position, or as a stroller for carrying a child in a sitting position. Such a carriage is shown in U.S. Pat. No. 4,836,573. In an effort to increase the utility of baby carriages, various collapsible frames were developed in order to make the carriages easier to store and transport. The carriages shown in the aforementioned U.S. Pat. No. 4,836,573 and in U.S. Pat. No. 4,606,550 are illustrative of such collapsible frames. However, the frame and wheel configuration of the aforementioned carriages are complicated to assemble and disassemble, and are not suitable for use on rough surfaces and uneven terrain, or at the faster speeds which might be associated with jogging or fitness-walking.

One attempt to solve the problem of making a carriage capable of traversing a rough surface or uneven terrain is to place the carriage onto a dolly having large surface bearing area wheels. A dolly having such a configuration is shown in U.S. Pat. No. 4,902,027. The major drawback of this solution is that two devices, a carriage and a dolly, must be used, thus increasing the difficulties associated with assembly, storage and transportation. An alternate solution is to provide a baby stroller having larger wheels, and a frame of more durable construction, thereby making the stroller suitable for traversing over a variety of terrain. Such a stroller is shown in U.S. Pat. No. 5,188,389. However, this stroller includes intricate coupler assemblies which must be disengaged in order for the stroller to be collapsed. Likewise, the frame tubes must be re-attached by the coupler assemblies in order to return this stroller to the upright configuration, so that the stroller cannot be returned to the upright operative position by the user through the use of one hand. Although the stroller of U.S. Pat. No. 5,188,389 collapses in height, the length of the frame is not reduced when collapsed, thus making it more difficult to store.

Accordingly, prior to the development of the present invention, no collapsible stroller existed which was capable of carrying either an infant or a toddler passenger, suitable for use over all types of terrain and ground surfaces, and transformable between a collapsed position of reduced height and length, and an upright position by the user through the use of one hand. A feature of the stroller of the present invention are releasable wheels which reduce its size and height for ease of storage and transportation. The advantages of the stroller of the present invention include its ability to carry passengers of both infant and toddler age, and its ability to be used for a variety of purposes, including shopping, recreation, jogging, or fitness-walking.

SUMMARY OF THE INVENTION

It is with these problems in mind that the present invention was developed. The present invention is a frame transformable between a collapsed position of reduced height and length and an upright position. The frame includes a base, an upper support, a lower support attached to the base, an upper brace attached to the lower support, and a lower brace attached to the base. Hinges connect the upper and lower support, and the upper and lower brace, to permit the transformation between collapsed and upright positions. A first hinge connects the upper support to the lower support. In the collapsed position, the upper support is substantially parallel to the lower support. In the upright position, the upper support is to the rear of, and aligned with, the lower support. A second hinge connects the upper brace to the lower brace. In the collapsed position, the lower brace is substantially parallel to the upper brace. In the upright position, both the upper and lower braces are substantially vertical. To transform the frame between the collapsed position and the upright position, the user pulls the upper support upwardly and rearwardly from the lower support.

The hinges which connect the frame elements may each include a first hinge element which has a first mating surface and a mating pin. A second hinge element includes a second mating surface having a mating aperture into which the mating pin is received. The two hinge elements are locked together in the upright position by a spring-biased hinge latch disposed on one of the hinge elements.

In one aspect of the invention, the frame includes one front wheel rotatably and releasably mounted on a front axle. Rear wheels are rotatably and releasably mounted on each end of a rear axle. A shock absorber may be disposed on the top end of the upper brace. An adjustable handle may be attached to the proximal end of the upper support.

In another aspect of the invention, the frame of the present invention is configured as a stroller, and further includes means for supporting a passenger disposed on the support of the frame.

BRIEF DESCRIPTION OF THE DRAWINGS

The invention will be better understood with respect to the accompanying drawings, in which.

DESCRIPTION OF THE PREFERRED EMBODIMENTS

Figure 1:
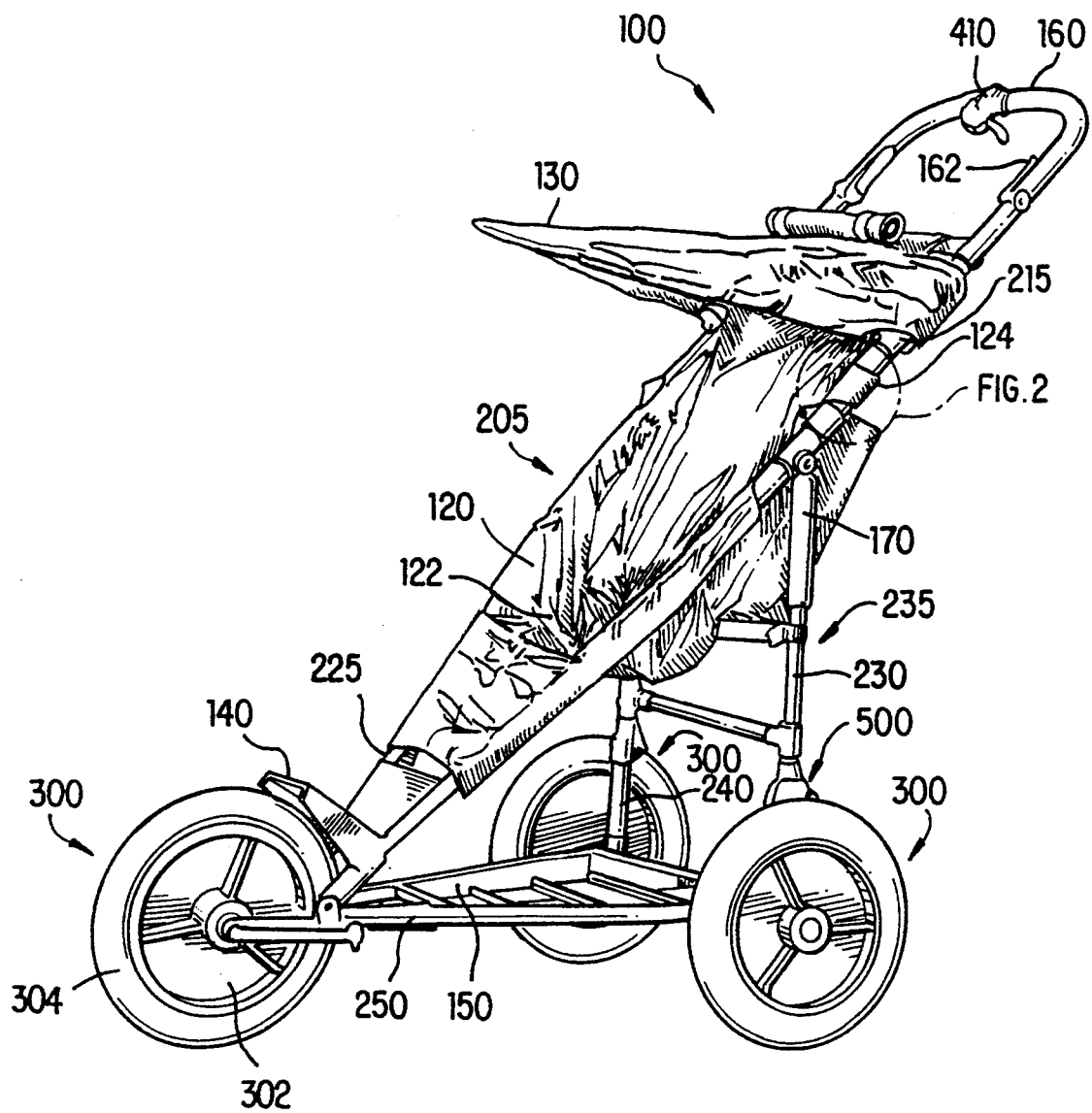
FIG. 1 is a perspective view of the collapsible stroller of the present invention in an upright operative position with a canopy and child support installed.

With continuing reference to the drawing figures in which similar reference numerals are used throughout the description to describe similar features of the invention, FIGS. 3 through 7 depict various views of the collapsible frame of the present invention. While the following description of the preferred embodiment of the invention is specifically directed toward a stroller, it is anticipated that the invention could be adapted for other uses. For example, the principles of the present invention could be translated into use as a trailer for use behind a bicycle or other vehicle.

Figure 2:
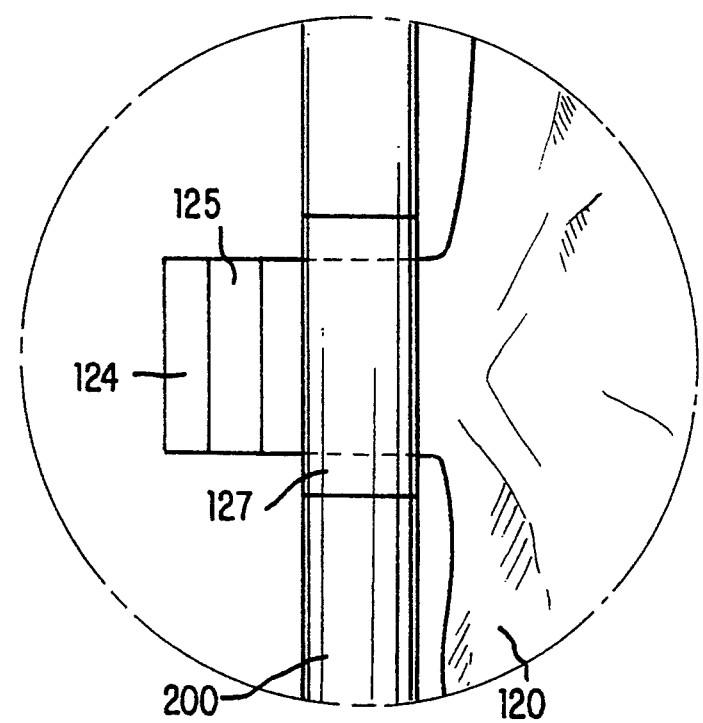
FIG. 2 is an expanded rear view of the attachment of the child support to the frame assembly shown in FIG. 1.

FIG. 1 is a perspective view of the collapsible stroller 100 of the present invention in an upright operative position with a child support 120 installed. The child support shown in FIG. 1 is suitable for a passenger of toddler size and weight, and includes a seat belt 122 for securing the passenger within support 120. As shown in FIG. 2, child support 120 is attached to stroller frame 200 through the use of a VELCRO TM or hook and loop type fastener. One portion of the hook and loop fastener 125 is attached to a flap 124 extending from child support 120. The other portion of the hook and loop fastener 127 is attached to stroller frame 200. Flap 124 is wrapped around frame 200 while fasteners 125 and 127 are placed in mating contact with each other. Several flaps 124 and fasteners 125, 127 are disposed about the periphery of support 120 and frame 200, respectively, to permit support 120 to be releasably and adjustably attached to stroller frame 200. Fastener 125 may extend along the entire length of flap 124 to provide the greatest degree of adjustability. The particular child support shown in FIG. 1 can be replaced with an infant support (not shown) for carrying passengers of infant size and weight in a reclined position. Such a support can be attached to frame 200 in the same manner as support 120 to allow the infant to recline and sleep.

Stroller 100 shown in FIG. 1 includes several features which improve the comfort of the passenger and of the user pushing the stroller. A canopy 130 provides protection from the sun and rain. Canopy 130 is supported by a canopy frame 132 shown in FIG. 3. Canopy frame 132 is connected to stroller frame 200 by inserting the ends of canopy frame 132 into a friction-fit connection 134 disposed on stroller frame 200. Canopy 130 can be collapsed for storage of stroller 100 by pivoting canopy frame 132 upward to meet stroller frame 200, as shown by arrow C in FIG. 3.

Figure 3:
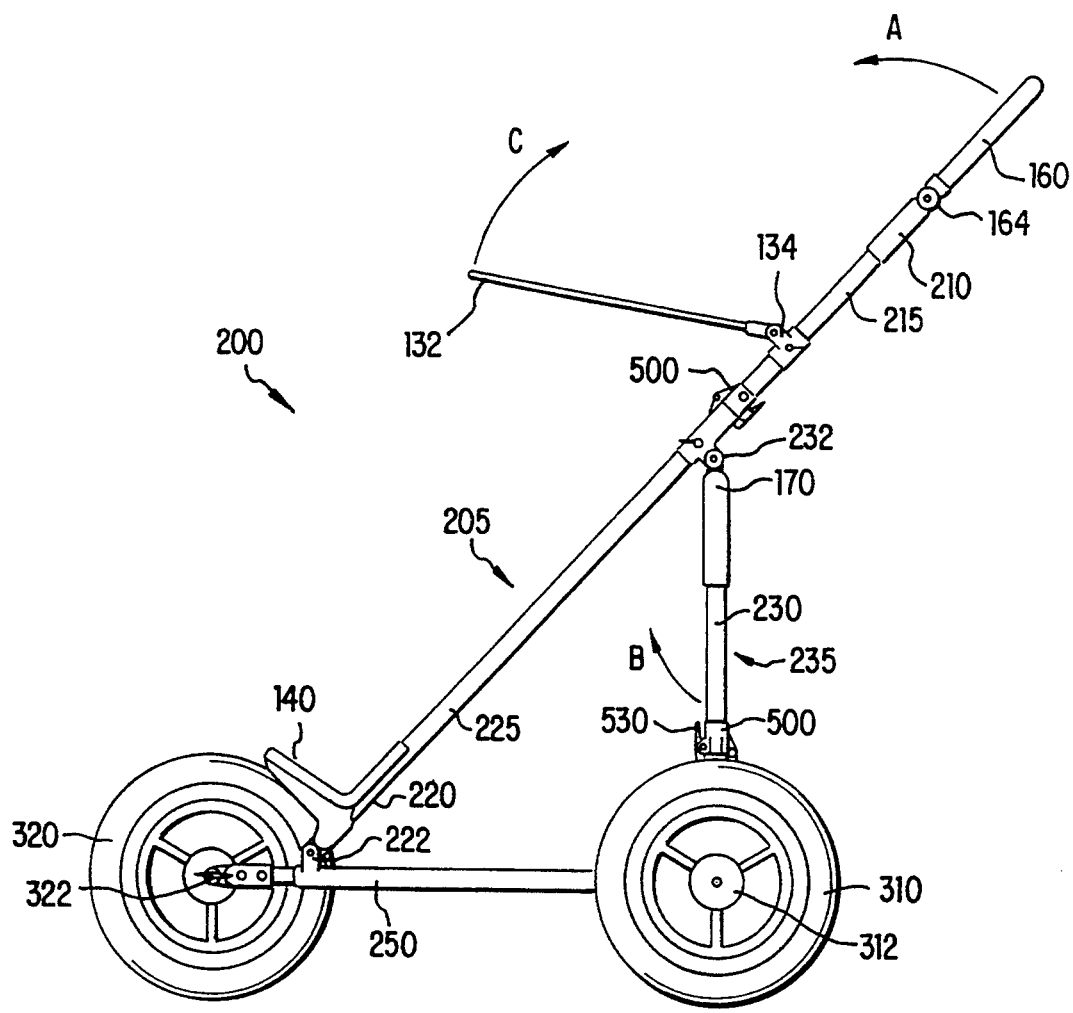
FIG. 3 is a side view of the collapsible frame of the present invention in an upright operative position.
Figure 4:
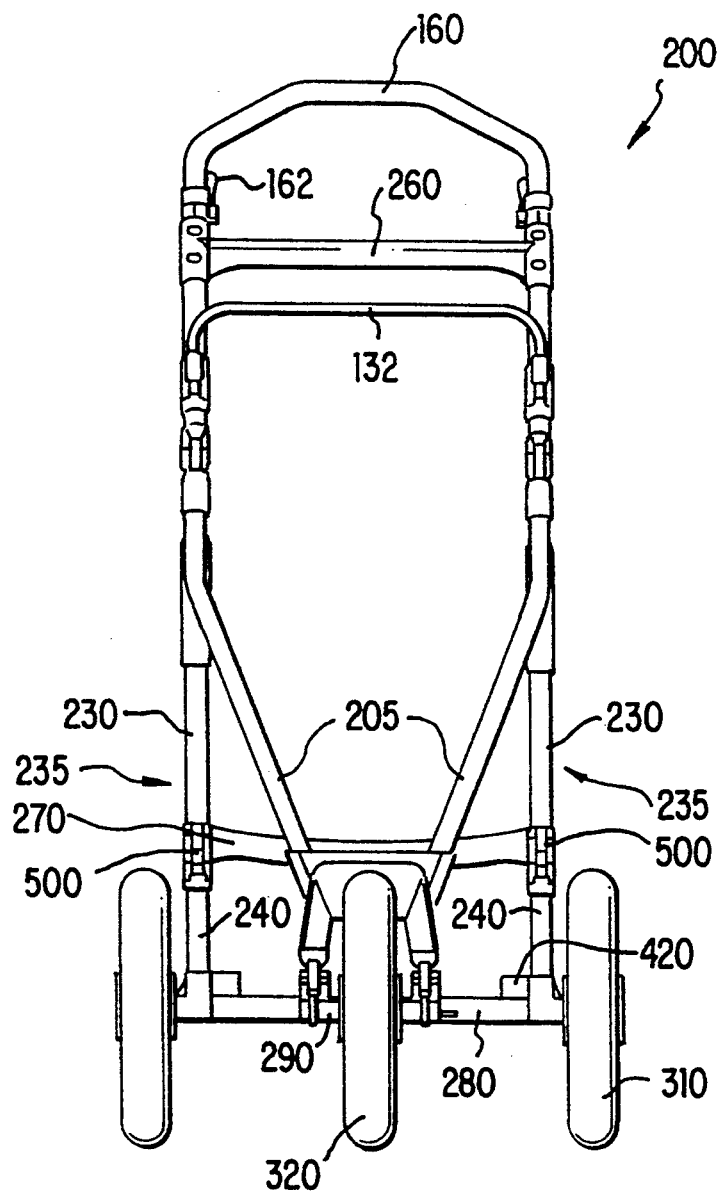
FIG. 4 is a front view of the collapsible frame of the present invention in an upright operative position.
Figure 5:
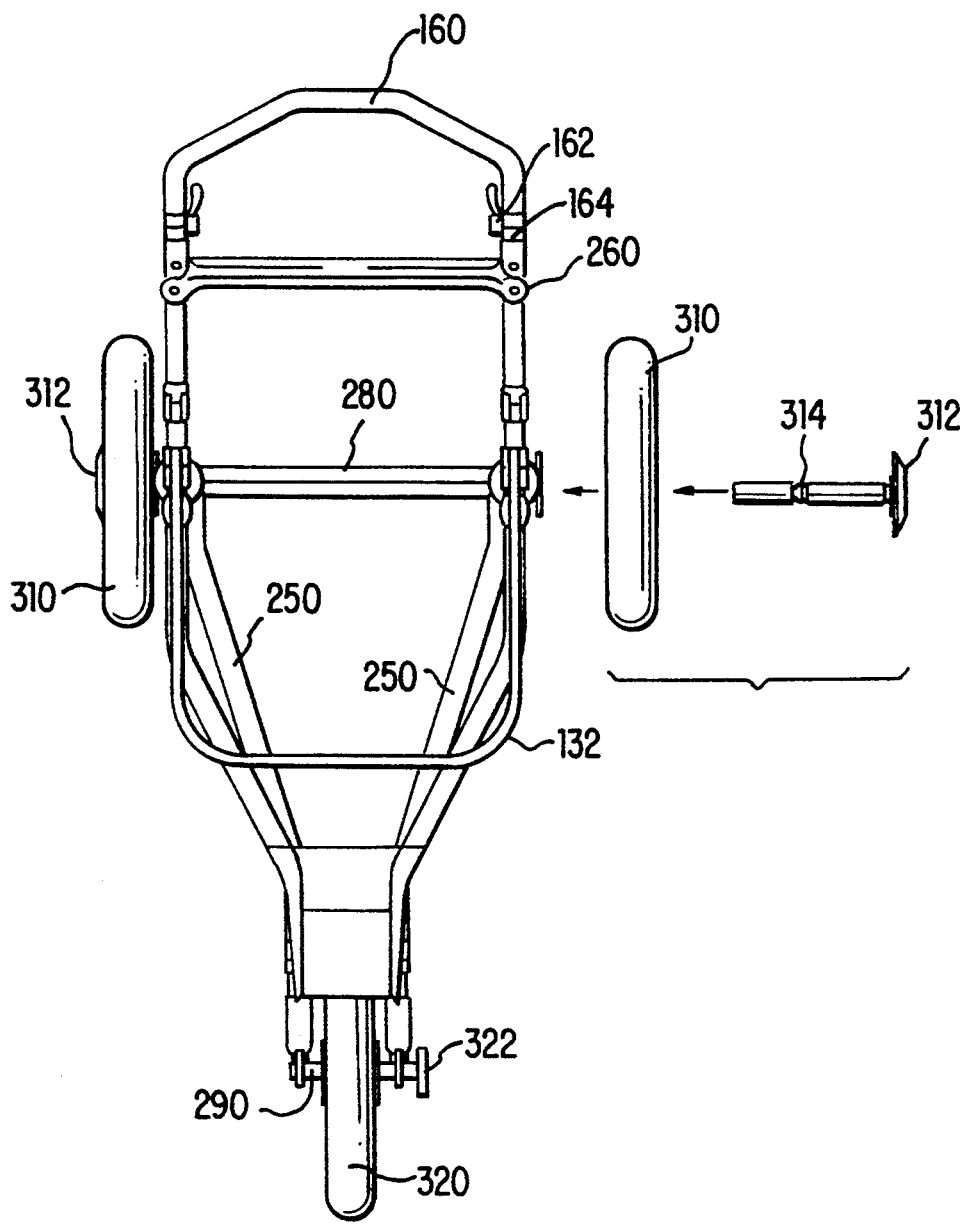
FIG. 5 is a top view of the collapsible frame of the present invention in an upright operative position.
Figure 6:
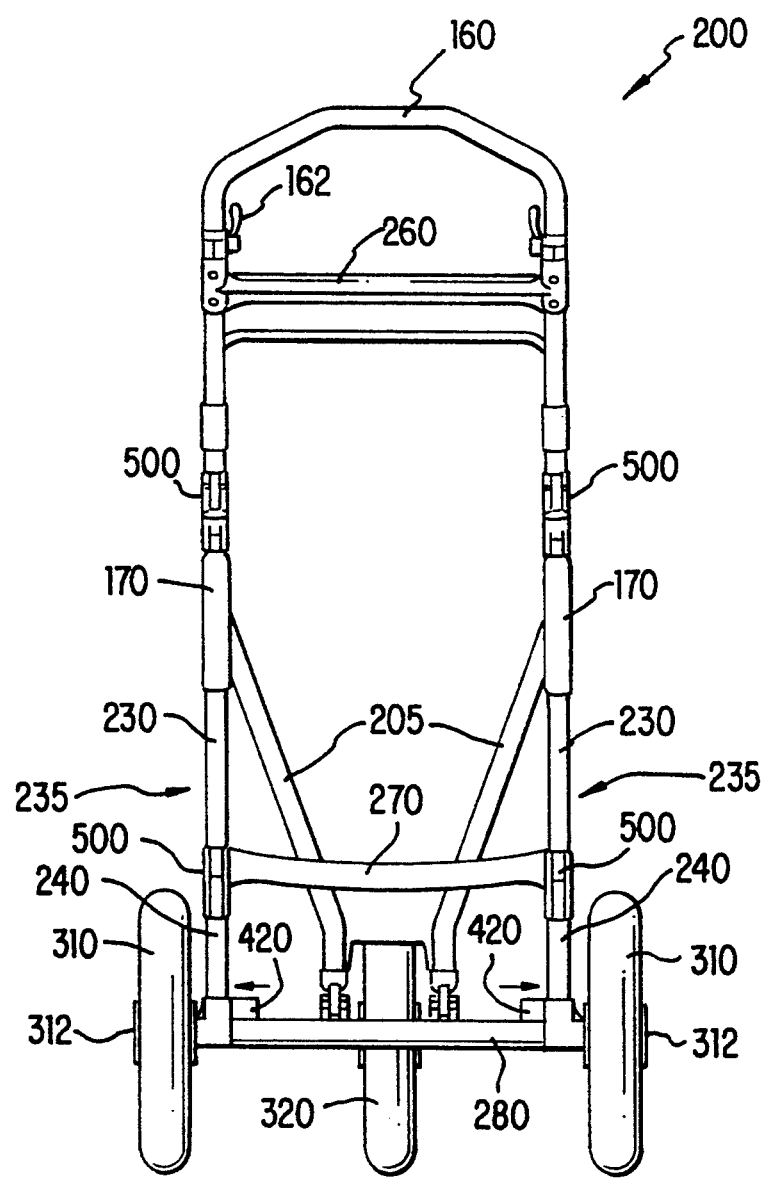
FIG. 6 is a rear view of the collapsible frame of the present invention in an upright operative position.

As shown in FIG. 1, stroller 100 includes three wheels 300 suitable for traversing over all types of terrain and any type of ground surface. Each wheel 300 is comprised of a rim 302 and a tire 304. Rim 302 shown in FIG. 1 is made from injection-molded polypropylene, and tire 304 is made from injection molded ethylene-vinyl-acetate (EVA), although other materials may be used. The wheels are removable from frame 200 to facilitate storage and transportation of stroller 100. Two rear wheels 310 are attached to a rear axle 280 (FIG. 4) by a first release pin 312 as shown in FIGS. 5 and 6. Each rear wheel 310 is attached to frame 200 by inserting release pin 312 through a hole (not shown) provided in rim 302 of each wheel 310 and into the hollow center of rear axle 280. When installed, release pin 312 is substantially flush with rear wheel 310, as shown for right rear wheel 310 in FIG. 5. Release pin 312 has a groove 314. A spring-biased metal tab (not shown), attached in a tongue-and-groove fashion to stroller frame 200, snaps into groove 314, thus preventing release pin 312 from separating from stroller frame 200. Rear wheels 310 can be prevented from rotating through the use of a rear axle parking brake, as shown in FIG. 6. A parking brake tab 420 is disposed on top of rear axle 280 proximate each rear wheel 310. Brake tabs 420 slide in the direction shown by the arrows into openings (not shown) formed in rim 302 of each rear wheel 310. A single front wheel 320 is attached to frame 200 by inserting wing nut 322 into the hollow center of a front axle 290, as shown in FIGS. 3 and 5. Wing nut 322 has double acme threads, thereby permitting attachment with a minimal number of turns. A plastic flap (not shown), projecting upwardly from stroller frame 200 adjacent wing nut 322, must be depressed before wing nut 322 can be rotated, thus preventing wing nut 322 from backing out due to vibration.

Stroller frame 200 is comprised of various tubular components, preferably welded tube aluminum. As best seen from FIG. 1, frame 200 is symmetrical so that the components which comprise the right side of stroller frame 200 (a base 250, a brace 235, and a support 205) are substantially identical with the corresponding components comprising the left side of stroller frame 200. The discussion below will be applicable to components of both the left and right sides of stroller frame 200, unless otherwise indicated.

The collapsible frame of the present invention is transformable between a collapsed storage position and an upright useable or operative position. A right side view of frame 200 of the present invention in an upright operative position is shown in FIG. 3. Stroller frame 200 includes a base 250. As shown in FIGS. 1 and 5, left and right base components 250 are connected at the rear of the stroller by rear axle 280, and at the front of the stroller by front axle 290.

Frame 200 further includes a support 205 which comprises an upper support 215 and a lower support 225. One end of a substantially U-shaped handlebar 160 is attached to the proximal end 210 of each left and right upper support 215. The distal end 220 of each lower support 225 is attached to base 250 by a mechanical pivot fastener 222, such as a steel semi-tubular rivet. Fastener 222 allows support 205 to pivot between an upright position shown in FIG. 3 and a collapsed position shown in FIG. 7. In the upright position, upper support 215 is disposed rearwardly of and substantially aligned with or in the same plane as lower support 225. Upper support 215 and lower support 225 are connected to each other by a hinge 500 which will be more fully described below.

The rear of stroller frame 200 includes a brace 235 comprised of upper and lower sections. As best seen in FIGS. 4 and 6, each upper brace 230 is connected to each lower brace 240 by a second hinge 500. In the upright position of stroller 100, each upper brace 230 and lower brace 240 are substantially aligned with each other in a generally vertical position. A shock absorber 170 is attached at one end to each upper brace 230. The other end of each shock absorber 170 is attached to support 205 by a mechanical pivot fastener 232, such as a steel semi-tubular rivet, as shown in FIGS. 3 and 7.

Figure 7:
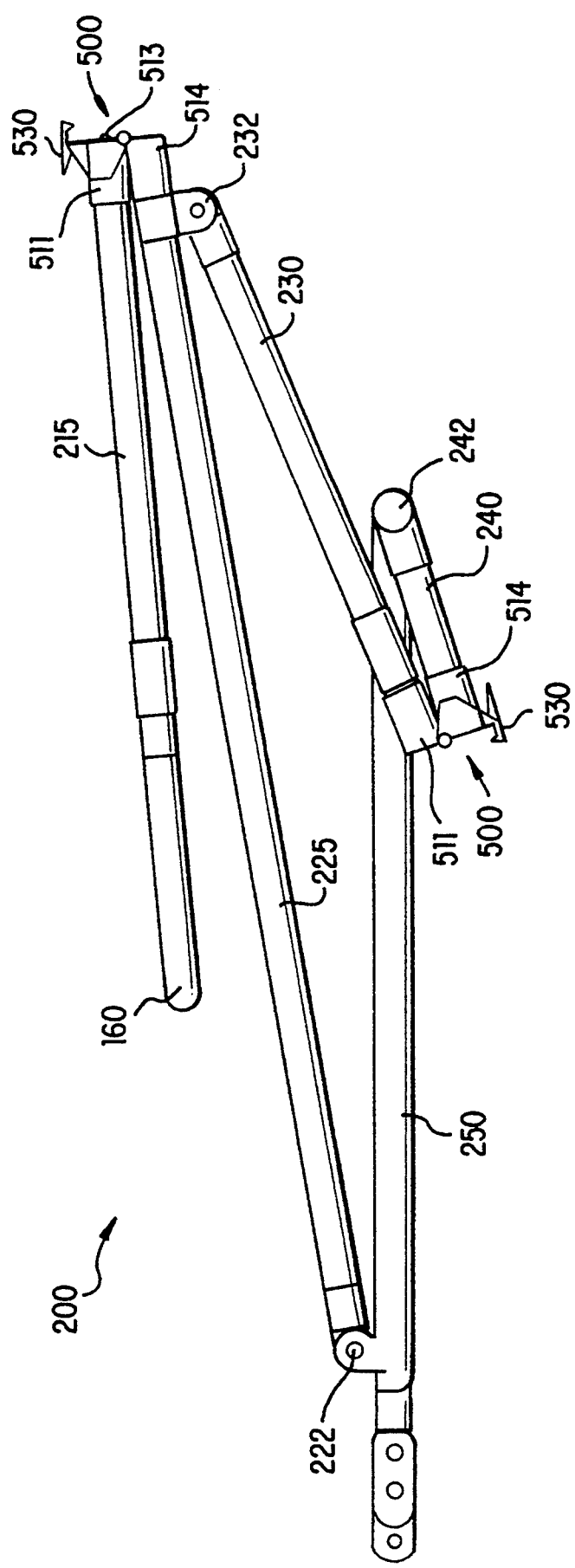
FIG. 7 is a side view of the collapsible frame of the present invention in a collapsed storage position.

Fastener 232 allows upper brace 230 to pivot between an upright useable position shown in FIG. 3 and a collapsed storage position shown in FIG. 7. Lower brace 240 is attached to base 250 by a friction fit connection 242 (see FIG. 7) attached to rear axle 280 which allows lower brace 240 to also pivot between an upright position and a collapsed position. As shown in FIG. 4, a lower transverse support 270 is connected between the bottom ends of left and right upper brace components 230. Likewise, an upper transverse support 260 is connected between left and right support components 205.

FIG. 6 best shows the location of the hinges 500. Hinges 500 allow stroller frame 200 to be transformed between an upright operative position as shown in FIG. 3 and a collapsed storage position as shown in FIG. 7. In the collapsed position shown in FIG. 7, proximal end 210 of upper support 215 has been pivoted in the direction shown by the arrow A in FIG. 3 to be substantially parallel to distal end 220 of lower support 225. Likewise, upper brace 230 has been pivoted in the direction shown by the arrow B in FIG. 3 to be substantially parallel to lower brace 240.

Figure 8:
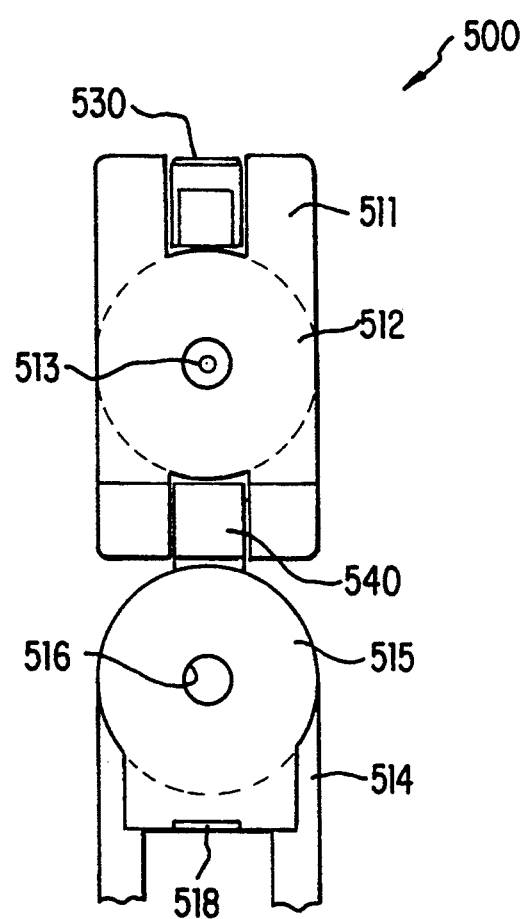
FIG. 8 and is a rear view of the top hinge shown in FIG. 7.
Figure 9:
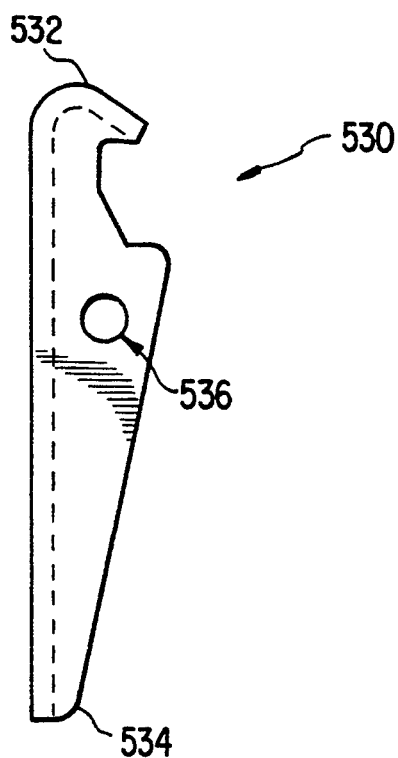
FIG. 9 is a side view of the hinge latch shown in FIG. 8.

Hinge 500 of the present invention, as shown in more detail in FIG. 8, includes an upper section 511 and a lower section 514 pivotably connected by a mechanical fastener 540, such as a steel semi-tubular rivet. Upper section 511 includes a mating surface 512 with a centrally disposed mating pin 513 which projects outward from mating surface 512. Lower hinge section 514 also has a mating surface 515 which includes a centrally disposed mating aperture 516. When stroller frame 200 is in the upright operative position, hinge 500 is closed, whereby mating pin 513 is received within mating aperture 516. Hinge 500 also includes a hinge latch 530 for securing or locking hinge 500 in the closed configuration. A side view of hinge latch 530 is shown in FIG. 9. A hinge latch 530 is pivotably mounted through a mounting hole 536 (see FIG. 9) on upper hinge section 511. Alternatively, hinge latch 530 can be mounted on lower hinge section 514. A metal piece is riveted directly into frame 200 below lower hinge section 514 to form a metal lip or catch 518 as shown in FIG. 8. A hook 532 disposed on one end of hinge latch 530 is configured to hook onto catch 518. Hinge latch 530 is pivotably mounted to upper section 511 by a spring (not shown) which biases hinge latch 530 in the locked or closed position. The hinge is opened or unlocked by pushing on a release end 534 of hinge latch 530 to release hook 532 from catch 518 below lower hinge section 514 thereby allowing upper section 511 and lower section 514 to pivot away from each other.

Hinge section 511 and hinge section 514 are made from injection-molded plastic, preferably an engineering resin to give it sufficient strength to withstand the load from a toddler-size passenger, and the stresses from repeated collapsing and opening of the stroller. Hinge latch 530 and catch 518 are metal pieces, with catch 518 riveted directly into the tubing of frame 200 so that it does not depend on plastic hinge sections 511 and 514 for strength.

A substantially U-shaped handlebar 160 is provided on frame 200. Handlebar 160 may be positioned relative to frame 200 to adjust to the particular user's height and stride through adjustment levers 162. To adjust handlebar 160, lever 162 is pivoted to separate the mated sides of a spline 164 (FIG. 3). The pressure from a spring (not shown) is used to separate the sides of spline 164. The handlebar may then be rotated either up or down to the preferred position, ensuring that the splines are aligned. Finally, lever 162 is pivoted back to mate the sides of spline 164 thereby locking the handlebar in position. Stroller 100 shown in FIG. 1 also includes a hand-activated front wheel brake 410, like a conventional caliper bicycle brake, to provide the user with more control on hilly terrain. Stroller 100 also includes a foot rest 140, which also functions as a fender for front wheel 320.

Figure 10:
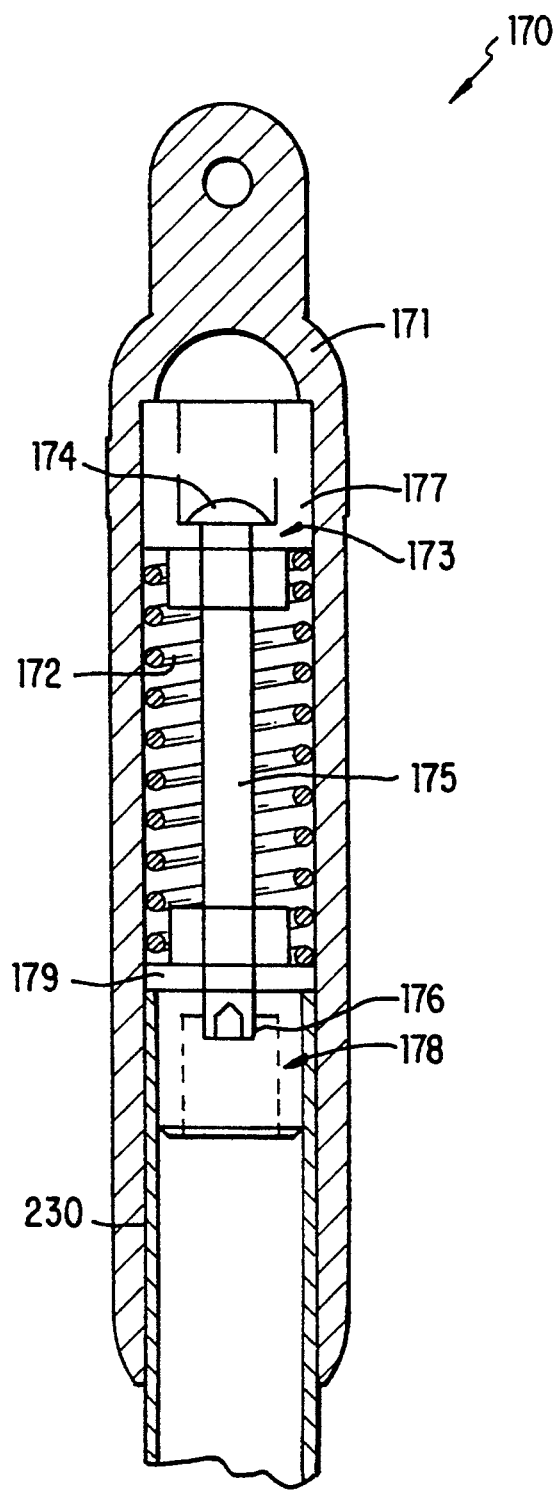
FIG. 10 is a cross-section of the shock absorber shown in FIG. 3.

Shock absorbers 170 are provided for each left and right rear wheel 310 to cushion the passenger's ride. A coil spring 172 (see FIG. 10) is disposed within a plastic housing 171 of each shock absorber 170 to absorb the variations produced by traversing over uneven terrain to provide a more even, smoother ride. As shown in FIG. 10, a semi-tubular rivet 173, having a cap 174 and a shaft 175, is received within the center of coil spring 172 so that coil spring 172 compresses and expands along the length of rivet shaft 175. To assemble shock absorber 170, rivet 173 is inserted through an upper spring perch 177 and coil spring 172. A lower spring perch 178, having a flange 179, is disposed on rivet shaft 175, below coil spring 172, so that it can travel along the length of rivet shaft 175. The bottom sections 176 of rivet shaft 175 are flared at approximately 45° (not shown) to secure lower spring perch 178 to rivet shaft 175. The assembly including upper spring perch 177, rivet 173, coil spring 172, and lower spring perch 178 is then slid into upper lower brace 230. The top of upper brace 230 is crimped onto flange 179. Shock housing 171 is then slid over this assembly. Upper spring perch 177 is secured to shock housing 171 by a rivet (not shown). When stroller 100 traverses over uneven terrain, upper brace 230 and lower spring perch 178 will move upward, thereby compressing coil spring 172. Likewise, upper brace 230 and lower spring perch 178 move downward when coil spring 172 expands. FIG. 10 shows coil spring 172 when fully expanded. Coil spring 172 is prevented from expanding further than shown in FIG. 10 because flared ends 176 of rivet 173 prevent lower spring perch 178 from moving downward any further. Lower spring perch 178 thus prevents shock absorber 170 from coming apart under extension.

The stroller of the present invention can be easily collapsed from an upright operative position to a storage position where the frame is collapsed in height and length as shown in FIG. 7. The overall length of stroller 100 is reduced by collapsing support 205 so that upper support 215 is substantially parallel to, and on top of, lower support 225. The overall height of stroller 100 is reduced by collapsing support 205 as described above, and by collapsing brace 235 so that upper brace 230 and lower brace 240 are substantially parallel to each other and are in a substantially horizontal position. The first step in collapsing the frame is to pivot canopy frame 132 (as shown by the arrow C in FIG. 3), if installed, so that it is parallel to the proximal or user end 210 of support 205. Next, release end 534 of hinges 500 on support 205 are depressed. Proximal end 210 of each support 205 is pivoted to be parallel with the distal end 220 of each support 205. Release ends 534 of the hinges 500 disposed on brace 230, 240 are depressed and upper brace 230 and lower brace 240 are then pivoted to be parallel with each other.

To transform stroller 100 from the fully collapsed position, as shown in FIG. 7, to the upright position, proximal end 210 of upper support 215 is pulled upwardly and rearwardly from distal end 220 of lower support 225. Proximal end of upper support 215 is thus pulled toward the user or person pushing the stroller. By doing so, support 205 is returned to its upright position, and brace 235 is returned to a substantially vertical position. The force of pulling up on proximal end 210 of upper support 215 causes hinges 500 to close, and spring-biased hinge latches 530 to snap into place to lock hinges 500. The stroller of the present invention can thus be transformed between a collapsed position and an upright position by one hand of the user, by simply pulling up on handle 160, without the need for any tools or reassembly of the stroller frame.

The stroller of the present invention is designed to be used for a variety of purposes, including shopping, recreation, running or fitness-walking, on all types of terrain and ground surfaces. The collapsible frame and releasable wheels make it easily transported. Various child supports can be used with the stroller so it can carry both infant and toddler passengers.

While various embodiments of the present invention have been described above, it should be understood that they have been presented by way of example only, and not limitation it is not intended to be exhaustive or to limit the invention to the precise form disclosed, and obviously many possible modifications and variations are possible in light of the above teaching. For example, it may be desired to add additional support and brace structure so that the frame can accommodate two child supports in side-by-side fashion. In this case, the overall width of the stroller from left to right would increase. Further, it may be desirable to add a second front axle to support a second wheel, particularly in the case where the frame is adapted to accommodate two child supports. It may also be desired to equip the collapsible frame of the present invention for carrying such things as athletic equipment. Thus the breadth and scope of the present invention should not be limited by any of the above described exemplary embodiments, but should be defined only in accordance with the following claims and their equivalents.

What is claimed is:

1. A frame transformable between a collapsed position and an upright position, comprising:
   a base;
   an upper support having a proximal end;
   a lower support having a distal end, said distal end connected to said base;
   an upper brace having top and bottom ends, said top end connected to said lower support;
   a lower brace having top and bottom ends, said bottom end of said lower brace connected to said base;
   a first hinge connecting said upper support to said lower support so that said upper support and said lower support are movable from said collapsed position wherein said upper support is disposed substantially parallel to said lower support, to said upright position wherein said upper support is disposed rearward of and substantially aligned with said lower support;
   a second hinge connecting said upper brace to said lower brace so that said upper brace and said lower brace are movable from said collapsed position wherein said lower brace is disposed substantially parallel to said upper brace, to said upright position wherein both said upper brace and said lower brace are substantially vertically disposed;
   wherein said frame is transformed from said collapsed position to said upright position by pulling said upper support upwardly and rearwardly from said lower support.

2. A frame according to claim 1, wherein said first hinge comprises:
   a first hinge element having a first mating surface and a mating pin;
   a second hinge element having a second mating surface defining a mating aperture for receiving therein said mating pin; and
   a spring-biased hinge latch disposed on said first hinge element, wherein said hinge latch locks said first hinge element to said second hinge element in said upright position.

3. A frame according to claim 1, wherein said second hinge comprises:
   a first hinge element having a first mating surface and a mating pin;
   a second hinge element having a second mating surface defining a mating aperture for receiving therein said mating pin; and
   a spring-biased hinge latch disposed on said first hinge element, wherein said hinge latch locks said first hinge element to said second hinge element in said upright position.

4. A frame according to claim 2, wherein said second hinge comprises:
   a first hinge element having a first mating surface and a mating pin;
   a second hinge element having a second mating surface defining a mating aperture for receiving therein said mating pin; and
   a spring-biased hinge latch disposed on said first hinge element, wherein said hinge latch locks said first hinge element to said second hinge element in said upright position.

5. A frame according to claim 1, further comprising:
   shock absorbing means disposed on said top end of said upper brace.

6. A frame according to claim 1, further comprising:
   a rear axle connected to said bottom end of said lower brace; and
   a rear wheel rotatably and releasably mounted on each end of said rear axle.

7. A frame according to claim 6, further comprising:
   a front axle connected to said base; and
   one front wheel rotatably and releasably mounted on said front axle.

8. A frame according to claim 1, further comprising:
   a handle connected to said proximal end of said upper support.

9. A frame according to claim 8, further comprising:
   means for adjusting the position of said handle relative to said upper support.

10. A frame according to claim 5, further comprising:
    a rear axle connected to said bottom end of said brace;
    a rear wheel rotatably and releasably mounted on each end of said rear axle;
    a front axle connected to said base; and one front wheel rotatably and releasably mounted on said front axle.

11. A stroller transformable between a collapsed position and an upright position, comprising:
    a base;
    an upper support having a proximal end;
    a lower support having a distal end, said distal end connected to said base;

an upper brace having top and bottom ends, said top end connected to said lower support;

a lower brace having top and bottom ends, said bottom end of said lower brace connected to said base:

a first hinge connecting said upper support to said lower support so that said upper support and said lower support are movable from said collapsed position wherein said upper support is disposed substantially parallel to said lower support, to said upright position wherein said upper support is disposed rearward of and substantially aligned with said lower support;

a second hinge connecting said upper brace to said lower brace so that said upper brace and said lower brace are movable from said collapsed position wherein said lower brace is disposed substantially parallel to said upper brace, to said upright position wherein both said upper brace and said lower brace are substantially vertically disposed;

means for supporting a passenger disposed on said upper support and said lower support;

wherein said frame is transformed from said collapsed position to said upright position by pulling said upper support upwardly and rearwardly from said lower support.

12. A stroller according to claim 11, wherein said first hinge comprises:

a first hinge element having a first mating surface and a mating pin;

a second hinge element having a second mating surface defining a mating aperture for receiving therein said mating pin; and a spring-biased hinge latch disposed on said first hinge element, wherein said hinge latch locks said first hinge element to said second hinge element in said upright position.

13. A stroller according to claim 11, wherein said second hinge comprises:

a first hinge element having a first mating surface and a mating pin;

a second hinge element having a second mating surface defining a mating aperture for receiving therein said mating pin; and a spring-biased hinge latch disposed on said first hinge element, wherein said hinge latch locks said first hinge element to said second hinge element in said upright position.

14. A stroller according to claim 12, wherein said second hinge comprises:

a first hinge element having a first mating surface and a mating pin;

a second hinge element having a second mating surface defining a mating hole for receiving therein said mating pin; and a spring-biased hinge latch disposed on said first hinge element, wherein said hinge latch locks said first hinge element to said second hinge element in said upright position.

15. A stroller according to claim 11, further comprising:

shock absorbing means disposed on said top end of said upper brace.

16. A stroller according to claim 11, further comprising:

a rear axle connected to said bottom end of said lower brace; and a rear wheel rotatably and releasably mounted on each end of said rear axle.

17. A stroller according to claim 16, further comprising:

a front axle connected to said base; and one front wheel rotatably and releasably mounted on said front axle.

18. A stroller according to claim 15, further comprising:

a rear axle connected to said bottom end of said lower brace;

a rear wheel rotatably and releasably mounted on each end of said rear axle;

a front axle connected to said base; and one front wheel rotatably and releasably mounted on said front axle.

19. A stroller according to claim 11, further comprising:

a handle connected to said proximal end of said upper support.

20. A stroller according to claim 19, further comprising:

means for adjusting the position of said handle relative to said upper support.

* * * * *